Figure 1:
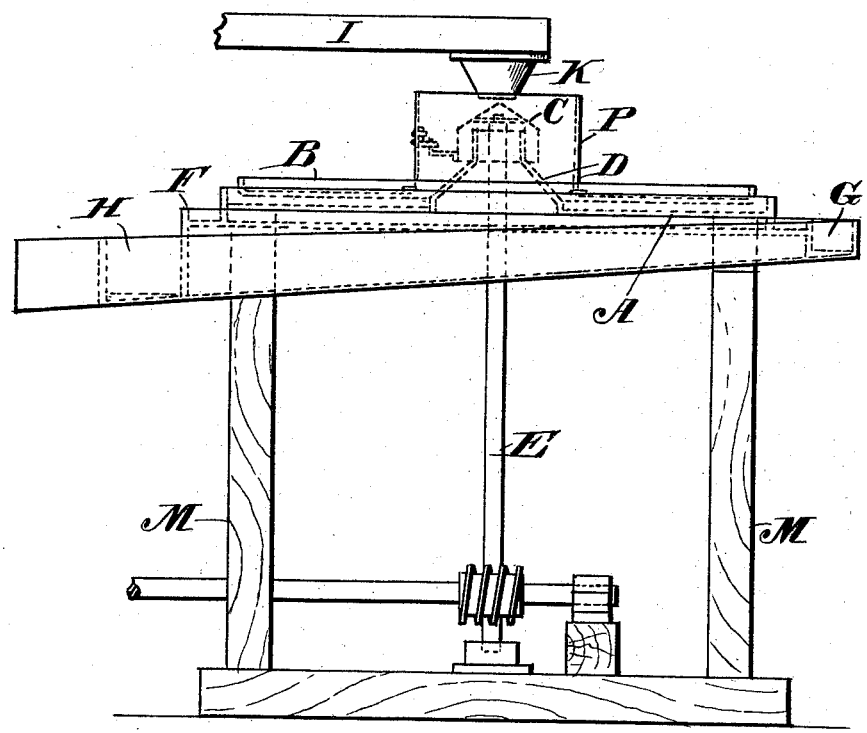

No. 611,506. Patented Sept. 27, 1898.
E. H. T. PLANT & S. DELLOW.
AMALGAMATING PAN.
(Application filed Sept. 2, 1897.)

(No Model.) 3 Sheets—Sheet 1.

Witnesses.
Robert Everett,

Inventors.
Edmund H. T. Plant
Samuel Dellow.
By James L. Norris
Atty.

No. 611,506. Patented Sept. 27, 1898.
E. H. T. PLANT & S. DELLOW.
AMALGAMATING PAN.
(Application filed Sept. 2, 1897.)
(No Model.) 3 Sheets—Sheet 2.
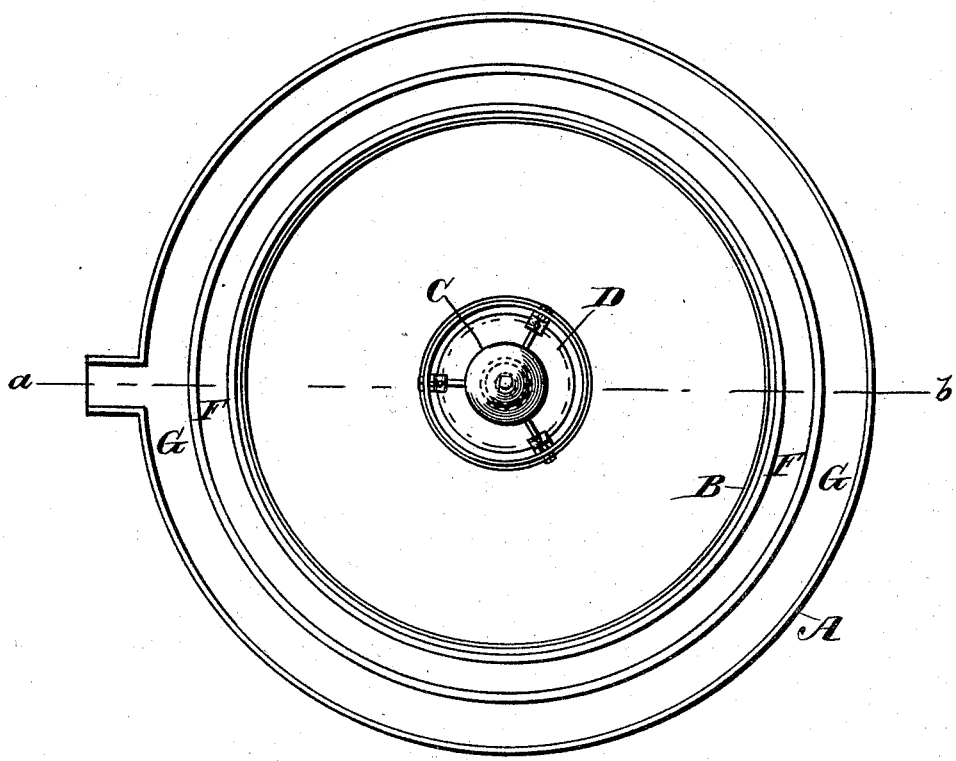
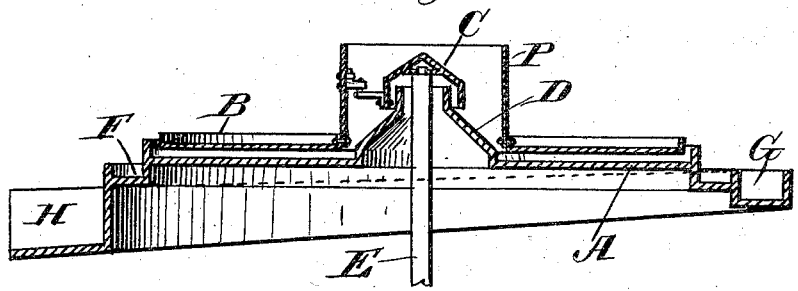

No. 611,506. Patented Sept. 27, 1898.
E. H. T. PLANT & S. DELLOW.
AMALGAMATING PAN.
(Application filed Sept. 2, 1897.)
(No Model.) 3 Sheets—Sheet 3.
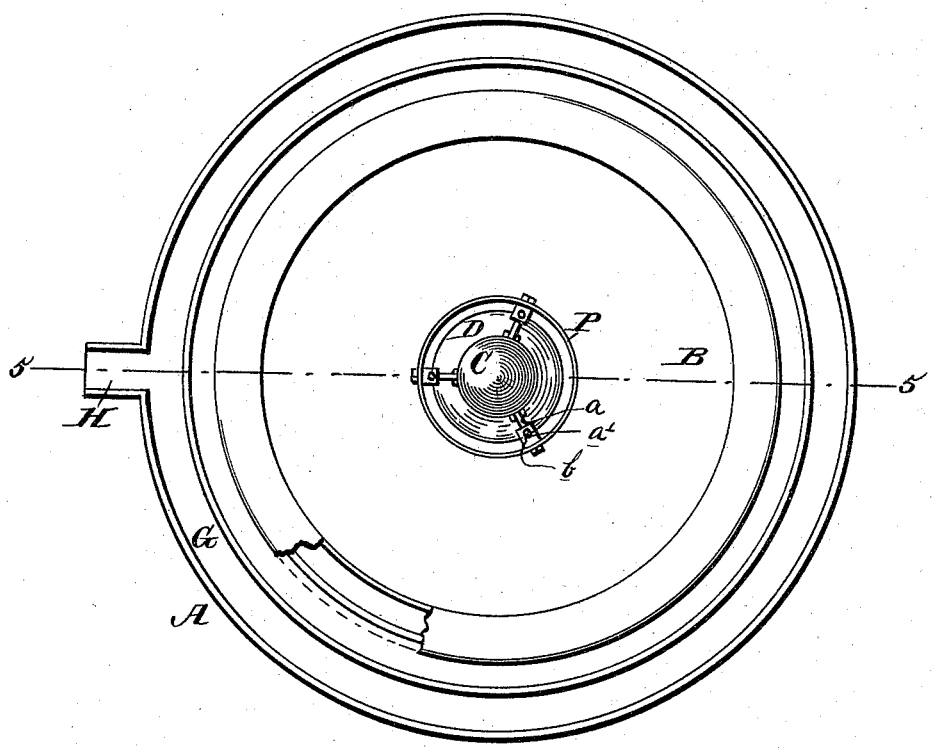
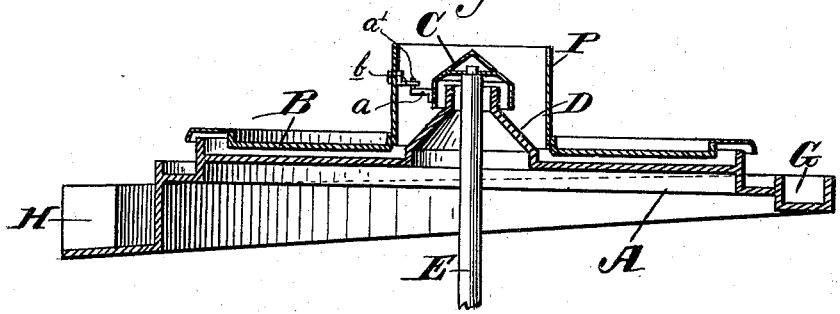

UNITED STATES PATENT OFFICE.

EDMUND HARRIS THORNBURGH PLANT AND SAMUEL DELLOW, OF CHARTERS TOWERS, QUEENSLAND.

AMALGAMATING-PAN.

SPECIFICATION forming part of Letters Patent No. 611,506, dated September 27, 1898.

Application filed September 2, 1897. Serial No. 650,413. (No model.) Patented in Queensland June 18, 1896, No. 3,402.

*To all whom it may concern:*

Be it known that we, EDMUND HARRIS THORNBURGH PLANT and SAMUEL DELLOW, subjects of the Queen of Great Britain and Ireland, residing at Charters Towers, in the Colony of Queensland, have invented a certain new and useful Improved Amalgamating-Pan, (for which we have obtained a patent in Queensland, No. 3,402, bearing date June 18, 1896,) of which the following is a specification.

This invention relates to an improved pan for amalgamating free gold and mercury, the object being to secure more effective amalgamation of the gold from crushed ore or other finely-divided auriferous material, greater economy in working, and prevention of theft while in operation.

According to our invention the pan is constructed of cast-iron or other suitable material, the bottom being made perfectly true. The depth of the pan is preferably about half an inch, and for the purpose of facilitating the collection of the amalgam there may be a recess around the circumference of the pan from one-eighth to three-eighths of an inch deep and of a width of about two inches. A metallic muller slightly less than the diameter of the pan floats on the surface of the mercury with which the bottom of the pan is covered and is rotated by means of several arms, which may be keyed to a central shaft which rises through an opening in the center of the pan, or the arms may be bolted to an iron hood which is keyed or otherwise secured to the shaft. The arms on the said hood engage with arms on the inside of a cylindrical casing which is bolted to the muller. The muller floats freely on the mercury, and the crushed ore and water are delivered between the hood and the said cylindrical casing and falling on the sloping sides at the center of pan pass between the muller and the mercury, thus securing perfect contact and amalgamation of the particles of gold with the mercury.

The pan is preferably provided with a mercury-ripple and a sloping chute or trough for the collection of the overflow at one point.

In order that our invention may be clearly understood, we will now describe same with reference to the accompanying drawings, in which—

Figure 1 is an elevation of our improved amalgamating-pan. Fig. 2 is a plan of same, while Fig. 3 is a sectional elevation through the line *a b*, Fig. 2. Fig. 4 is a plan view showing the construction by which provision is made for the collection of skimmings. Fig. 5 is a diametrical section of the parts shown in Fig. 4, the line of section being denoted by the numerals 5 5 in the figure last named.

The same reference-letters indicate the same parts.

A is the pan containing the mercury and auriferous material to be amalgamated.

B is the circular muller bolted to the cylindrical casing P; D the substantially cone-shaped truncated center of pan A, and C is the hood for preventing the material falling through the opening in the center. The hood C is of conical form and provided with a depending flange, which extends below the open top of the cone-shaped center D, and it is keyed or otherwise secured to the shaft E and has arms bolted to it, the said arms engaging with arms bolted to the inside of the casing P.

F is a mercury-ripple, which, if desired, may be kept full of mercury.

G is a sloping chute or trough for collecting the overflow to one point at discharge-chute H.

I is a chute into which the material to be treated is delivered and leading to a hopper K, from which it is fed into the pan.

M is the framing.

The drawings show the shaft E rotated by means of a worm-wheel and gearing; but, if desired, the shaft may be driven overhead or in any other convenient way, according to the situation.

It will be evident that the construction of the pan is such that the amalgam cannot be interfered with except by the person in charge.

The dimensions of the pan may be varied according to the quantity of material which it is desired to treat in a given time.

For the purpose of collecting skimmings we may make the muller of slightly less diameter than shown in Figs. 1, 2, and 3 of the drawings, so as to leave the mercury beyond the circumference of the muller uncovered, and we rivet a narrow strip of sheet-iron onto the edge of the muller or pan to overlap the mercury not covered by the muller and thus prevent theft.

The connection between the arms $a$, which project from the hood C, and the arms $b$ on the inner face of the circular casing P is of such a kind that the muller B is allowed to float freely upon the mercury in the pan, rising somewhat when the quantity of pulp in the pan is increased and moving downward as the quantity decreases. One of the objects of our invention is to provide a construction which will permit the muller to float with perfect freedom upon the surface of the mercury and accommodate itself to the rise and fall of that surface, while at the same time it revolves without obstruction. One form of connection for this purpose is shown in the drawings and has been described. It will be seen that when the surface of the mercury rises and floats the muller B upward the arms $b$, having eyes or loops, will ride upward upon the pintles or pivot-pins $a'$, which rise from the outer ends of the arms $a$ upon the hood. The maximum variation in level is comparatively small, and the pintles are long enough to permit it without the eyes or loops slipping off.

Having now described our invention, what we claim as new, and desire to secure by Letters Patent, is—

1. An amalgamating-pan comprising a shallow, annular receptacle for mercury having a central opening over which rises a cone-shaped center portion, a conical hood having a flange hanging below the truncated open top of the center portion, a central shaft rising through the latter and rigidly secured to the hood, a muller consisting of a flat, annular plate floating freely upon the surface of the mercury in the pan, its inner edge, which surrounds the base of the conical center portion, being provided with a circular casing which rises around the conical hood and a connection between said casing and hood consisting of inwardly and outwardly extending arms on one or the other of said parts, those on one having eyes or loops which loosely engage vertical pintles, or pivot-pins rising from the ends of the arms on the other part, whereby the muller is rotated and permitted to rise and descend with the surface of the mercury in the pan, substantially as described.

2. An amalgamating-pan comprising a shallow, horizontal, annular receptacle having an opening at the center through a conical central portion, a surrounding, concentric mercury-ripple having its bottom at a lower level than that of the pan, and an outer, annular concentric trough having its highest point on one side of the pan below the bottom of the mercury-ripple and inclining uniformly from said point to a discharge-chute on the opposite side, a shaft rising through the central conical portion and projecting above its truncated top, a conical hood rigid on the end of said shaft and having a flange that drops below the open top of the central portion, a muller consisting of a flat, annular plate having a circular casing rising from its inner edge and surrounding the central portion and conical hood, and a connection formed by arms projecting from the inner face of said casing and provided with eyes, or loops and arms projecting from the flange on the conical hood and provided with upright pintles, or pivot-pins, which enter the eyes in the arms on the casing, substantially as described.

3. An annular-plate amalgamating-pan having a muller which consists of a flat, annular plate, having a diameter somewhat less than that of the pan to expose a narrow, annular portion of the mercury, the outer edge of the muller being provided with an annular strip of metal secured to the outer edge of the muller and projecting outward over the edge of the pan to cover said exposed portion of mercury, a central shaft extended upward through a central opening in the table its upper end having a conical hood, and arms on the inner face of the casing and projecting from the outer face of a flange on the conical hood, one set of said arms having upright pintles, or pivot-pins, and the other set having eyes or loops adapted to engage said pintles, whereby the muller is enabled to float upon the mercury in the pan and to rise and fall therewith without interfering with the rotary movement, substantially as described.

In witness whereof we have hereunto set our hands in presence of two witnesses.

EDMUND HARRIS THORNBURGH PLANT.
  SAMUEL DELLOW.

Witnesses:
  HENRY GEORGE PITHER,
  GEORGE URQUHART.